June 5, 1934.   R. PAXTON   1,961,779
CONTROL OF ELECTRIC SWITCHES
Filed July 2, 1931

Inventor:
Robert Paxton,
by Charles V Tulla
His Attorney.

Patented June 5, 1934

1,961,779

UNITED STATES PATENT OFFICE 1,961,779

CONTROL OF ELECTRIC SWITCHES

Robert Paxton, Philadelphia, Pa., assignor to General Electric Company, a corporation of New York Application July 2, 1931, Serial No. 548,379

5 Claims. (Cl. 175—294)

My invention relates to improvements in the control of electric switches and more particularly circuit breakers which are opened automatically on the occurrence of abnormal circuit conditions and which are arranged to be closed by operating suitable control switches to complete the circuit of electromagnetic means arranged to close the circuit breakers.

If a control switch is maintained in its circuit closing position after the circuit breaker closes and the circuit breaker immediately opens, due to an abnormal condition on the circuit it controls, the closing circuit of the circuit breaker is again completed as soon as the circuit breaker reaches its open position and the circuit breaker is reclosed. Under such conditions, the circuit breaker continues to open and close rapidly while the abnormal condition lasts and the control switch remains closed. This so-called pumping action, if allowed to continue, may result in serious damage to the apparatus.

An object of my invention is to provide an improved arrangement for preventing the repeated opening and closing of a circuit breaker under the conditions mentioned.

My invention will be better understood from the following description when considered in connection with the accompanying drawing and its scope will be pointed out in the appended claims.

Figure 1:
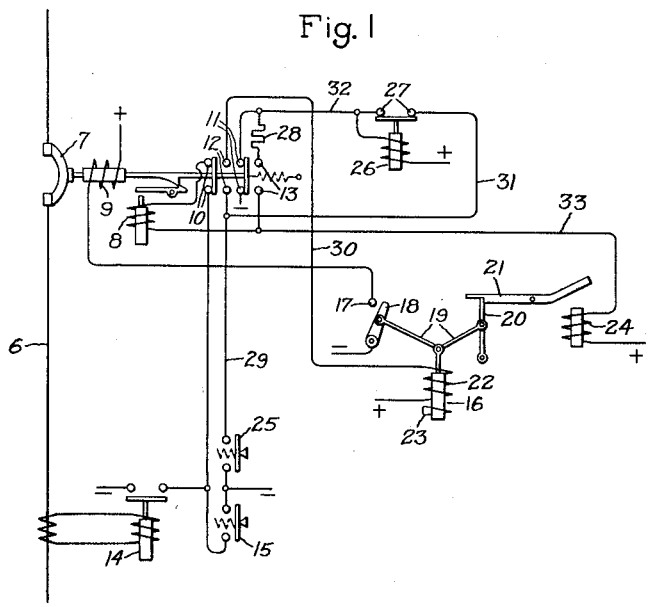
Figure 2:
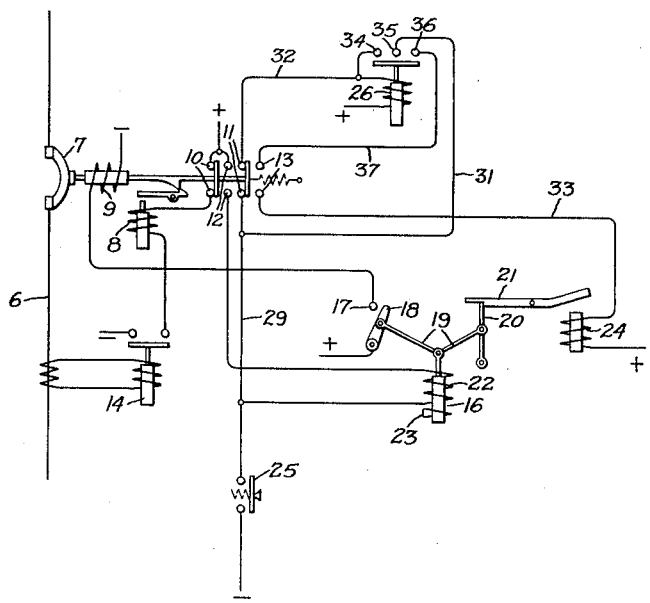

In the accompanying drawing, Fig. 1 illustrates diagrammatically a circuit breaker control arrangement embodying my invention and Fig. 2 illustrates diagrammatically a modification of my invention.

Referring now to Fig. 1, an electric circuit 6, shown in single line diagram for clearness, is arranged to be controlled by a circuit breaker 7. This is shown as of the latch-closed type and is provided with any suitable opening and closing means, such as a trip coil 8 and a closing solenoid 9. The circuit breaker is also provided with auxiliary switch contacts 10, 11, 12, 13. The contacts 10 and 11 are arranged to be closed when the circuit breaker is closed and opened when the circuit breaker is opened while the contacts 12 and 13 are arranged to be closed when the circuit breaker is opened and vice versa. For effecting the opening of the circuit breaker in response to abnormal circuit conditions, any suitable means, such as an overcurrent relay 14 connected to be energized in accordance with the current of the circuit and arranged to control the circuit of the trip coil 8, may be provided. The opening of the circuit breaker may also be effected by a manually or otherwise controlled switch 15 whose contacts, together with the circuit breaker auxiliary contacts 10, are arranged in series in the circuit of the trip coil 8.

For controlling the closing solenoid 9, there is provided a control relay 16 shown as of the hesitating trip-free type. This control relay includes cooperating contacts 17, 18 in the circuit of the solenoid 9, a toggle mechanism 19, a movable abutment 20 for the toggle mechanism and a latch 21 for restraining the abutment 20. For operating the movable contact 18, the relay is provided with an operating winding 22. In order to retard the decay of flux in the magnetic structure associated with the operating winding 22 when the circuit thereof is broken so as to delay the opening of the contacts 17, 18 and thereby provide time to insure latching of the circuit breaker, a short-circuited winding 23 is provided. In order to prevent the closing of the contacts 17, 18 under certain conditions, the relay is provided with a releasing winding 24 to trip the latch 21 free of the abutment 20 and thereby render the relay 16 inoperative to energize the solenoid 9. For controlling the relay 16, its operating winding 22 may be connected in series with the contacts of a control switch 25 and the circuit breaker auxiliary switch contacts 12 in series.

In accordance with my invention, I provide means for preventing a reclosure of the circuit breaker 7 upon the opening thereof while the control switch 25 is closed. As shown in Fig. 1, this includes a relay 26 which is connected to be energized upon the closing of the circuit breaker. For this purpose the relay 26 may have its energizing winding connected in series with the circuit breaker auxiliary switch contacts 11. This relay includes means, such as its contacts 27, operative upon energization of the relay to maintain it energized upon opening of the circuit breaker while the control switch is closed. The control relay releasing coil 24 is controlled conjointly by the relay 26 and the control switch 25 through their series related contacts in a circuit which may include the current limiting means 28 and the circiut breaker auxiliary switch contacts 13.

If desired, the releasing coil 24 of the control relay 16 may be included in the circuit of the trip coil 8. Connecting the releasing coil in this manner precludes any possibility of the circuit breaker starting to reclose after an automatic tripping because it absolutely prevents any possibility of the control relay contacts 17 and 18 closing by eliminating any race between the operation of the windings 22 and 24.

Assuming now that the circuit breaker 7 is open, then upon closing the control switch 25, the circuit of the control relay operating winding 22 is completed as follows: From minus through the control switch, conductor 29, circuit breaker auxiliary switch contacts 12, conductor 30, operating winding 22 to plus. Assuming that the latching mechanism of the control relay is in position as shown in the drawing, the energization of the operating winding 22 closes the contacts 17 and 18 of the control relay to complete the circuit of the solenoid 9. The closing operation of the circuit breaker opens the operating winding circuit at the contacts 12 before the circuit breaker is latched, but the hesitating feature of the relay 16 maintains the contacts 17, 18 closed sufficiently long to insure the proper latching of the circuit breaker. Upon the closing of the circuit breaker, the relay 26 is energized through the circuit breaker auxiliary switch contacts 11 to close its contacts 27.

If the circuit breaker 7 is closed on a faulty circuit, the protective relay means 14 immediately operates to effect the opening of the circuit breaker. If for any reason the operator has held the control switch 25 closed, the opening of the circuit breaker will keep the relay 26 energized through its contacts 27 in a circuit from minus, through the control switch 25, conductors 29 and 31, relay contacts 27, and the winding of relay 26 to plus. Consequently, the circuit of the releasing winding 24 of the control relay is completed from minus through the control switch 25, conductors 29 and 31, relay contacts 27, conductor 32, resistor 28, auxiliary switch contacts 13, conductor 33, and releasing winding 24 to plus. The energization of the releasing winding immediately trips the latch 21 of the control relay thereby rendering this relay inoperative to close its contacts 17, 18 until the control switch 25 has been opened long enough to drop out the relay 26. When this has occurred, the latch 21 will reset and the apparatus is in condition to reclose the circuit breaker when it appears desirable or necessary. It will thus be obvious that, if for any reason the switch 25 is maintained closed when the circuit breaker is closed on a faulty circuit, the operator cannot cause a pumping action of the circuit breaker by merely maintaining the control switch closed.

In the embodiment of my invention shown in Fig. 2, the relay 26 is provided with three contacts 34, 35 and 36. Contacts 35 and 36 are arranged in series with the circuit breaker auxiliary switch contacts 13 and the contacts of the control switch 25 in the circuit of the releasing winding 24 of the control relay 16. The relay 26 is energized upon closing of the circuit breaker 7 through the control switch 25 and the circuit breaker auxiliary switch contacts 11. When the relay 26 is energized, it completes a circuit from minus through the control switch 25, conductor 29, conductor 31, contacts 35 and 34 and its winding 26 to plus whereby to maintain itself energized as long as the control switch is held closed.

In this embodiment of my invention, if the circuit breaker opens immediately after being closed and while the control switch 25 is closed, the circuit of the releasing winding 24 will be completed as follows: From minus through the control switch 25, conductors 29 and 31, contacts 35 and 36 of relay 26, conductor 37, circuit breaker auxiliary switch contacts 13, conductor 33, and releasing winding 24 to plus. The releasing winding being thus energized, the control relay 16 is tripped and it cannot operate to close its contacts 17, 18 until the control switch is opened to effect the energization of the relay 26 and thereby the releasing winding 24.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. In combination, an electric circuit, a circuit breaker for controlling said circuit, means for closing said circuit breaker, means for controlling said closing means including a control relay, a control switch for controlling said control relay, and means for preventing a reclosure of said circuit breaker upon the opening thereof while said control switch is closed including another relay connected to be energized upon the closing of said circuit breaker, said other relay including means operative upon energization of the relay to maintain the relay energized upon opening of the circuit breaker while the control switch is closed and means conjointly controlled by said other relay and said control switch for rendering the control relay inoperative.

2. In combination, an electric circuit, a circuit breaker for controlling said circuit, means for closing said circuit breaker, means for controlling the energization of said closing means including a trip-free control relay, a control switch for controlling said control relay and means for preventing the reclosure of said circuit breaker upon the opening thereof while said control switch is closed including another relay connected to be energized upon the closing of the circuit breaker, said other relay including means operative upon energization of the relay to maintain the relay energized upon opening of the circuit breaker while the control switch is closed and means conjointly controlled by said other relay and said control switch for tripping said control relay.

3. In combination, an electric circuit, a circuit breaker for controlling said circuit, means for closing said circuit breaker, means for controlling said closing means including a control relay, a control switch for controlling said control relay and means for preventing a reclosure of said circuit breaker upon the opening thereof while said control switch is closed including another relay having a winding connected to be energized upon the closing of said circuit breaker, said other relay including contacts operative upon energization of the winding to maintain the circuit thereof upon opening of the circuit breaker while the control switch is closed and means conjointly controlled by said other relay and said control switch for rendering the control relay inoperative.

4. In combination, an electric circuit, a circuit breaker for controlling said circuit, means for closing said circuit breaker, means for controlling the energization of said closing means including a control relay having operating and releasing windings, a control switch for controlling the energization of said control relay windings, and means for preventing a reclosure of said circuit breaker upon the opening thereof while said control switch is closed including another relay connected to be energized upon the closing of said circuit breaker, said other relay including means operative upon energization of the relay to maintain the relay energized upon opening of the circuit breaker while the control switch is closed and means conjointly controlled by said other relay and said control switch for energizing the releasing winding of said control relay to render the relay inoperative to effect the energization of said closing means.

5. In combination, an electric circuit, a circuit breaker for controlling said circuit, auxiliary switching means associated with said circuit breaker operative to close when the circuit breaker opens, means including a winding for opening said circuit breaker, means for controlling the energization of said winding, means for closing said circuit breaker including a closing switch, a control circuit, a control relay having contacts in said control circuit, a trip-free operating mechanism for actuating said contacts, an operating winding for actuating said mechanism, an energizing circuit for said operating winding including said auxiliary switch and said closing switch in series relation and means for preventing said operating winding from effectively actuating said operating member to close said contacts when the circuit breaker opens while the closing control switch is closed including a releasing winding connected in circuit with the winding of said opening means for energization prior to the energization of said operating winding whereby to release said operating mechanism before the operating winding can actuate said contacts.

ROBERT PAXTON.